(12) United States Patent
Park et al.

(10) Patent No.: US 7,794,091 B2
(45) Date of Patent: Sep. 14, 2010

(54) IMAGE OFFSET ADJUSTMENT APPARATUS FOR LCD PROJECTOR AND MOBILE PHONE HAVING THE SAME

(75) Inventors: Sang-Chan Park, Yongin-si (KR); Hyun-Soo Kim, Suwon-si (KR); Ki-Tae Lee, Seoul (KR); Kang-Hoon Lee, Yongin-si (KR); Cheong-Sun Lee, Suwon-si (KR); Dae-Hyun Sim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 711 days.

(21) Appl. No.: 11/800,946

(22) Filed: May 8, 2007

(65) Prior Publication Data

US 2007/0258059 A1 Nov. 8, 2007

(30) Foreign Application Priority Data

May 8, 2006 (KR) .................... 10-2006-0041224

(51) Int. Cl.
*G03B 21/14* (2006.01)
(52) U.S. Cl. ........................................ 353/70; 353/101
(58) Field of Classification Search .................. 353/69, 353/70, 100, 101; 359/649, 708; 349/56, 349/117
See application file for complete search history.

(56) References Cited

U.S. PATENT DOCUMENTS

2005/0024603 A1 2/2005 Yang et al.
2006/0077359 A1 4/2006 Lin
2007/0165191 A1* 7/2007 Shimada ...................... 353/70
2009/0251622 A1* 10/2009 Mitsuhashi et al. ......... 348/745

FOREIGN PATENT DOCUMENTS

| EP | 1 791 329 | 5/2007 |
| KR | 20-0404789 | 12/2005 |
| KR | 1020070035802 | 4/2007 |
| WO | WO 2004/053588 | 6/2004 |

* cited by examiner

*Primary Examiner*—Kevin Pyo
(74) *Attorney, Agent, or Firm*—The Farrell Law Firm, LLP

(57) ABSTRACT

An image offset adjustment apparatus for an LCD projector which is constructed to enable the adjustment of an image offset. The LCD projector includes a light source for emitting light, mirrors, and an LCD installed in front of the mirrors so that an image generated in the LCD is enlarged and projected on a screen. The image offset adjustment apparatus includes a projection lens section including a plurality of projection lenses having their respective LCDs at different circumferential positions to have different image offsets; a lens housing for housing the respective projection lenses adjacent to one another in a circumferential direction; rotation means for rotating the lens housing; and a controller for controlling the rotation means so that the lens housing can be controllably rotated to select one of the projection lenses and one of the image offsets as desired by a user.

4 Claims, 9 Drawing Sheets

IMAGE OFFSET ADJUSTMENT APPARATUS FOR LCD PROJECTOR AND MOBILE PHONE HAVING THE SAME

PRIORITY

This application claims a priority based on an application entitled "Image Offset Adjustment Apparatus For LCD Projector And Mobile Phone Having The Same" filed with the Korean Intellectual Property Office on May 8, 2006 and assigned with Serial No. 2006-41224, the contents of which are incorporated herein by reference.

BACKGROUND OF THE INVENTION

1. Field of the Invention

The present invention relates to an image offset adjustment apparatus for an Liquid Crystal Display (LCD) projector which is constructed to enable the adjustment of an image offset in an LCD projector.

2. Description of the Related Art

Projectors that can project a small image on a large screen and that use a flat display having a slim configuration, instead of a Cathode Ray Tube (CRT) display limited screen size and a large system size, has drawn considerable attention. While a projector can adopt a CRT or an LCD as a display for a small image, an LCD projector using an LCD has been highlighted in step with the trend toward miniaturization. An LCD projector employs a transmission type LCD or a reflection type LCD.

The LCD projector has been developed for miniaturized size, light weight and high brightness, and the LCD has been developed for high aperture ratio and high resolution. Therefore, in order to achieve high resolution, miniaturization and low cost which are demanded in the LCD projector, a reflection type LCD is generally preferred in use as a display.

The LCD projector represents a system in which light is transmitted to an LCD serving as an image generation module to generate an image and the generated image is projected to a large screen after being enlarged through optical lenses.

FIG. 1 illustrates the optical construction of an LCD projector 1. The LCD projector 1 comprises a light source 2 for generating light A1 and having a parabolic mirror (not shown), first and second reflection mirrors 3 and 4 arranged in front of the light source 2, an LCD 5 and a plurality of projection lenses 6 installed in front of the reflection mirrors 3 and 4. A screen 7 is placed in front of the projection lenses 6. Any flat surface can act as a screen.

The parabolic mirror (not shown) is disposed behind the light A1 and reflects the light A1 incident on the reflection surface thereof. The parallel light rays reflected from the parabolic mirror are incident on the LCD 5. As electric signals corresponding to an image to be obtained are selectively applied to a plurality of electrodes for driving liquid crystals, the alignment of the liquid crystals filled in the selected electrodes is changed, and an image 8 is generated. The image 8 generated in the LCD 5 is enlarged by the projection lenses 6, and the enlarged image 8 is projected on the screen 7. The first and second reflection mirrors 3 and 4 function to reflect an optical path so that the locations of the respective component elements are suited to the size and the configuration of the system.

In the LCD projector 1, in order to ensure that a clear image is obtained on the screen 7, the respective component elements including the projection lenses 6 are optically arranged in a manner such that the image 8 which is generated by selectively transmitting the light A1 incident on the LCD 5 can be precisely focused on the screen 7.

As shown in FIGS. 2 and 3, the entire area measured between the projection lenses 6 and the lower and upper ends of the image 8 is referred to as the image offset of the LCD projector.

As shown in FIG. 2, when projecting the image 8 on the screen 7, the image offset indicates the entire image. When the projected image is referenced as 100%, and if a projection angle is changed to accomplish an image offset greater than 100%, the changed projection angle remains fixed. This is because it is impossible to change a projection angle once the projection angle is set.

In the conventional LCD projector, since an image offset value is set in conformity with the fixed position of the projection screen, in the event that the size and position of the image are altered, the image offset cannot be adjusted in conformity with the altered size and position of the image, whereby a clear image cannot be provided.

Also, in the case where an image offset adjustment apparatus is separately mounted to the conventional LCD projector, the size of the resultant LCD projector is increased, which affects the miniaturization of the LCD projector.

Miniaturized LCD projectors are now being supplied in mobile phones.

A mobile phone provides a communication function and various additional service functions. That is, in addition to a wireless communication function, the mobile phone provides a variety of functions for processing multimedia data. The mobile phone capable of processing multimedia data can include a camera, a TV receiver, a satellite broadcasting receiver, programs for performing various functions such as games, and so forth. Therefore, the mobile phone has been developed as a multi-functional terminal.

Each of the various functions is implemented in a manner such that the image of the corresponding function is displayed on the display screen of the mobile phone and an audio is provided along with the image. For example, as a user selects broadcasting among TV channels through a conventional mobile phone, an image of the selected TV channel is provided on the display screen of the mobile phone, and audio is provided through a speaker built in the mobile phone or an earphone connected to the mobile phone.

The conventional mobile phone has a problem in that, since the size of a display screen for displaying an image is limited, the image generated in the mobile phone cannot but be provided to the user only through the limited display screen of the mobile phone. In order to cope with this problem, the LCD projector can be provided to the mobile phone to enable display of an enlarged image.

However, in this case, because the mobile phone having the conventional LCD projector requires a separate screen which must be always carried together with the mobile phone, the portability of the mobile phone is deteriorated. Also, when the mobile phone is used for various documents or personal entertainment, due to the fixed projection angle of the LCD projector, the size and the position of a desired projection screen vary depending upon the size of an image to be projected, whereby it is impossible to provide a clear image. In order to provide a clear image, while the image offset of the LCD projector must be adjusted, a separate image offset adjustment apparatus is not provided to the LCD projector.

SUMMARY OF THE INVENTION

Accordingly, the present invention has been made to solve at least the above-mentioned problems occurring in the prior art, and an aspect of the present invention is to provide an image offset adjustment apparatus for an LCD projector which is constructed to enable the adjustment of an image offset in an LCD projector so that the image offset of the LCD projector can be selected in conformity with the size and the position of an image to be projected and thereby a clear image can be provided.

Another aspect of the present invention is to provide a mobile phone having an image offset adjustment apparatus for an LCD projector, in which an image offset adjustment apparatus for an LCD projector is provided to a mobile phone to be easily carried and to allow the size and the position of a desired image to be changed to conform with the surrounding conditions without using a separate screen.

In order to achieve the above objects, according to the first embodiment of the present invention, there is provided an image offset adjustment apparatus for an LCD projector including a light source for emitting light, mirrors arranged in front of the light source to reflect light, and an LCD installed in front of the mirrors so that reflected light is transmitted to the LCD, that, when electric signals corresponding to a desired image drive liquid crystals and are selectively applied to a plurality of electrodes, alignment of the liquid crystals filled in the selected electrodes is changed to generate an image, and that the image generated in the LCD is enlarged and projected on a screen, the image offset adjustment apparatus includes a projection lens section including a plurality of projection lenses having their respective LCDs at different circumferential positions to have different image offsets; a lens housing for installing the respective projection lenses adjacent to one another in a circumferential direction; rotation means for rotating the lens housing; and a controller for controlling the rotation means so that the lens housing can be controllably rotated to select one of the projection lenses and thereby one of the image offsets as desired by a user.

In order to achieve the above aspects, according to another embodiment of the present invention, there is provided an image offset adjustment apparatus for an LCD projector including a light source for emitting light, mirrors arranged in front of the light source to reflect light, and an LCD installed in front of the mirrors so that reflected light is transmitted to the LCD, that, when electric signals corresponding to a desired image drive liquid crystals and are selectively applied to a plurality of electrodes, alignment of the liquid crystals filled in the selected electrodes is changed to generate an image, and that the image generated in the LCD is enlarged and projected on a screen, the image offset adjustment apparatus includes a projection lens section including a plurality of LCDs to have different image offsets; rotation means for rotating one of the reflection mirrors; and a controller for controlling the rotation means so that the reflection mirror can be controllably rotated to select one of the LCDs and thereby one of the image offsets as desired by a user.

In order to achieve the above aspects, according to another embodiment of the present invention, there is provided an image offset adjustment apparatus for an LCD projector including a light source for emitting light mirrors arranged in front of the light source to refract light, and an LCD installed in front of the mirrors so that reflected light is transmitted to the LCD, that, when electric signals corresponding to a desired image drive liquid crystals and are selectively applied to a plurality of electrodes, alignment of the liquid crystals filled in the selected electrodes is changed to generate an image, and that the image generated in the LCD is enlarged and projected on a screen, the image offset adjustment apparatus including a projection lens section including a projection lens having a front surface on which the LCD is located; moving means positioned adjacent to the projection lens to move the projection lens; and a controller for controlling the moving means so that the LCD can be moved integrally with the projection lens when the projection lens is moved, to select one of image offsets as desired by a user.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Figure 1:
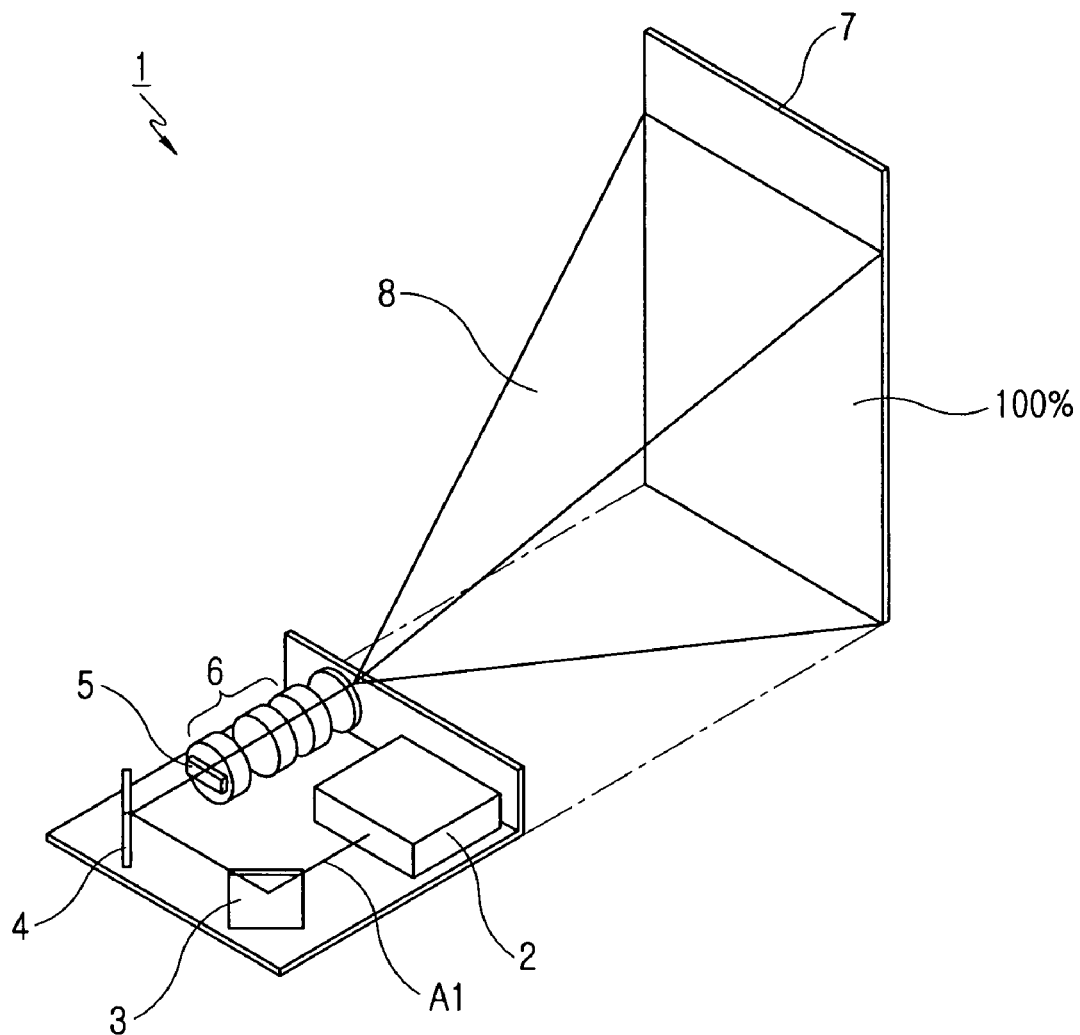
FIG. 1 is a perspective view illustrating an in-use state of a conventional LCD projector.
Figure 2:
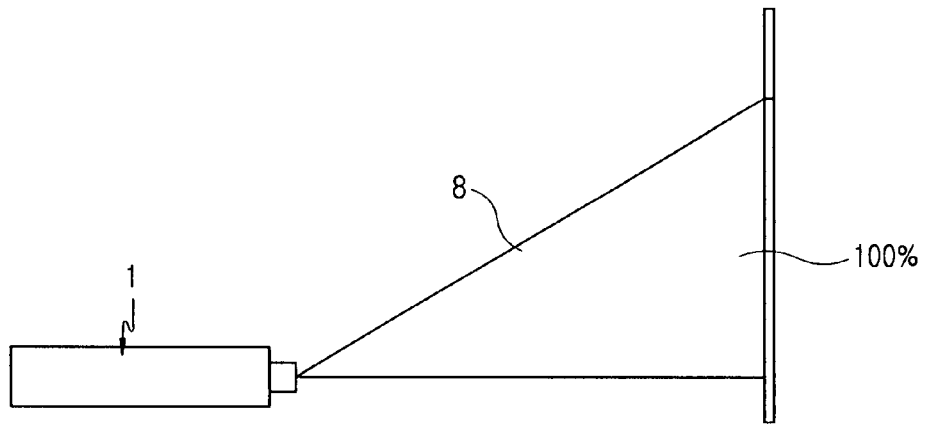
FIG. 2 is a view illustrating an image offset of the conventional LCD projector.
Figure 3:
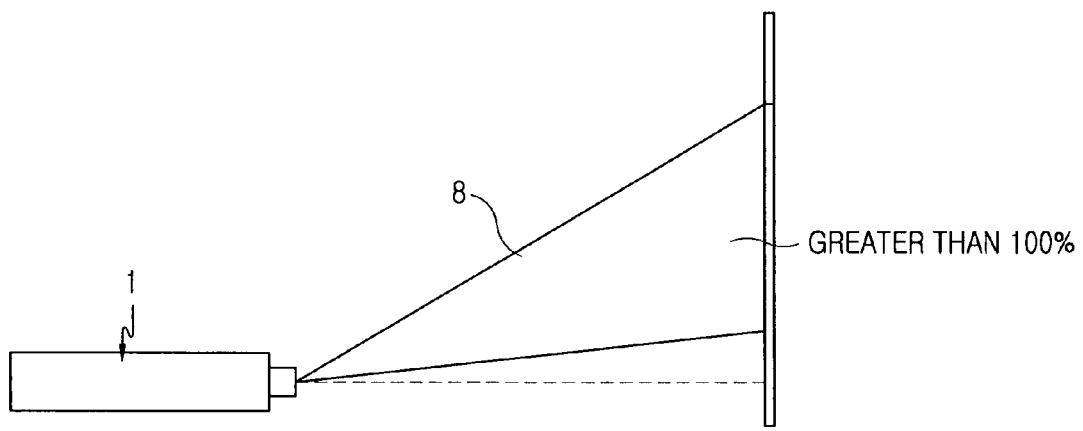
FIG. 3 is a view illustrating another image offset of the conventional LCD projector.

Hereinafter, a first embodiment of the present invention will be described with reference to the accompanying drawings. In the following description, the same component parts will be designated by the same reference numerals although they are shown in different drawings.

Figure 4:
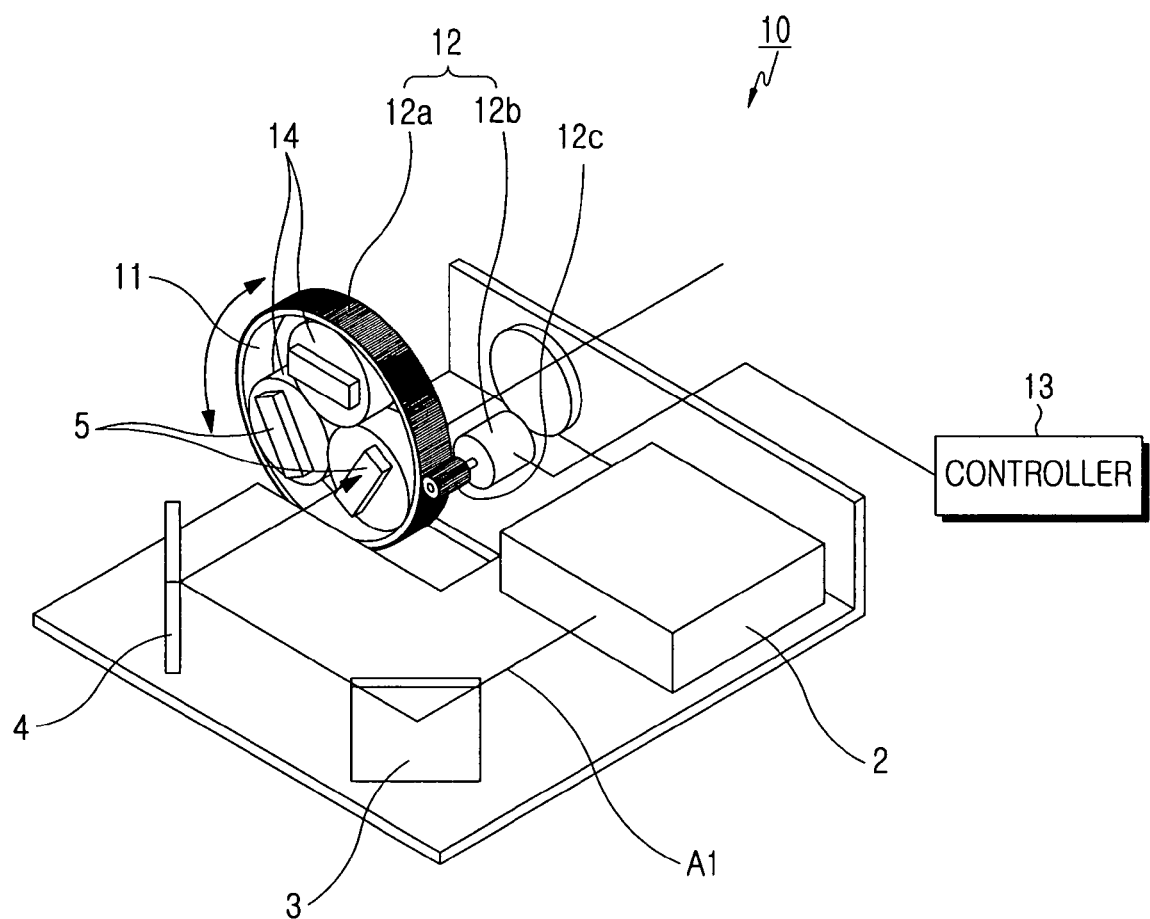
FIG. 4 is a perspective view illustrating the construction of an image offset adjustment apparatus for an LCD projector in accordance with a the present invention.

As shown in FIG. 4, an LCD projector comprises a light source 2 for emitting light A1, first and second mirrors 3 and 4 arranged in front of the light source 2 to reflect the light A1, LCDs 5 installed in front of the reflection mirrors 3 and 4 so that the reflected light A1 is transmitted to one of the LCDs 5 and that, when electric signals corresponding to a desired image drive liquid crystals and are selectively applied to a plurality of electrodes, alignment of the liquid crystals filled in the selected electrodes is changed to generate an image, and a screen (not shown) on which the image generated in one of the LCDs 5 is projected after being enlarged.

Figure 5:
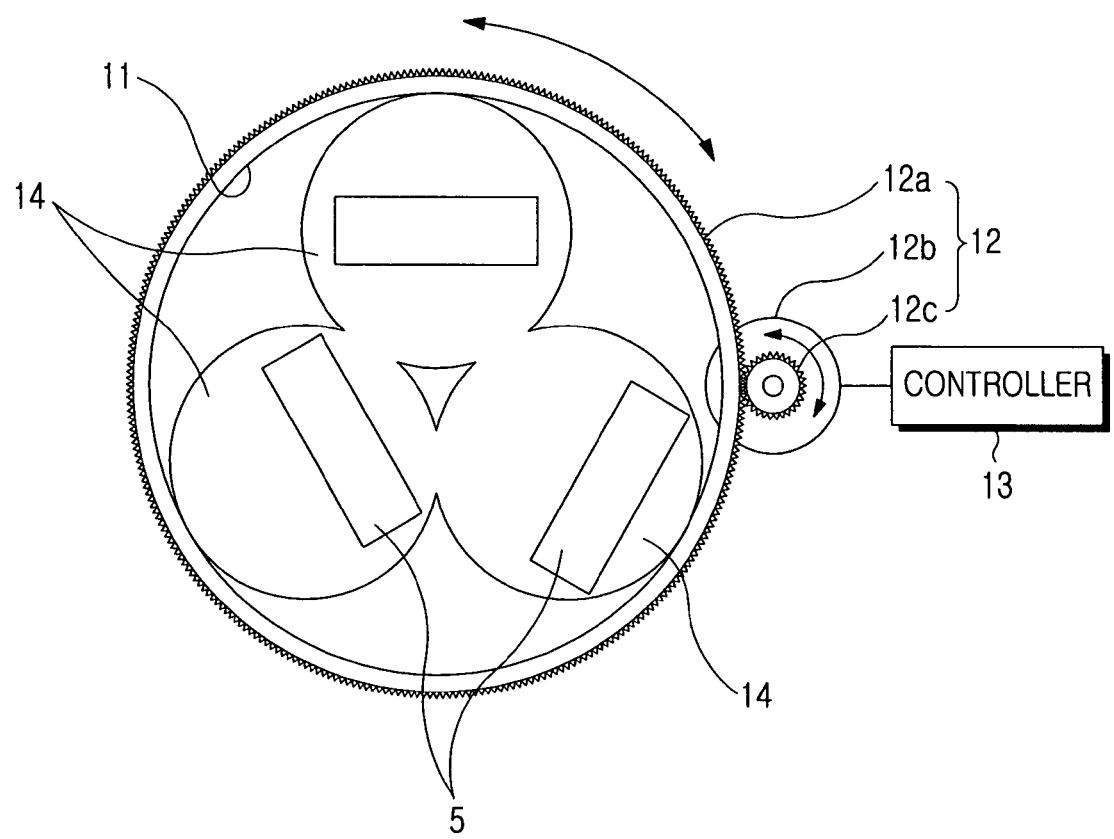
FIG. 5 is a front view illustrating the operation of the image offset adjustment apparatus for an LCD projector in accordance with the present invention.

Referring to FIGS. 4 and 5, an image offset adjustment apparatus 10 for an LCD projector comprises a projection lens section including a plurality of projection lenses 14, a lens housing 11, rotation means 12, and a controller 13. The projection lens section includes the plurality of projection lenses 14 on which the LCDs 5 are respectively placed at different circumferential positions to have different image offsets. The projection lenses 14 are adjacently installed inside the lens housing 11. The lens housing 11 is rotatably provided in front of the second mirror 4. The rotation means 12 is positioned adjacent to the lens housing 11 to rotate the lens housing 11. In order to allow a user to select a desired image offset, the controller 13 functions to control the rotation means 12 so that one of the projection lenses 14 can be selected through rotation of the lens housing 11.

Figure 10:
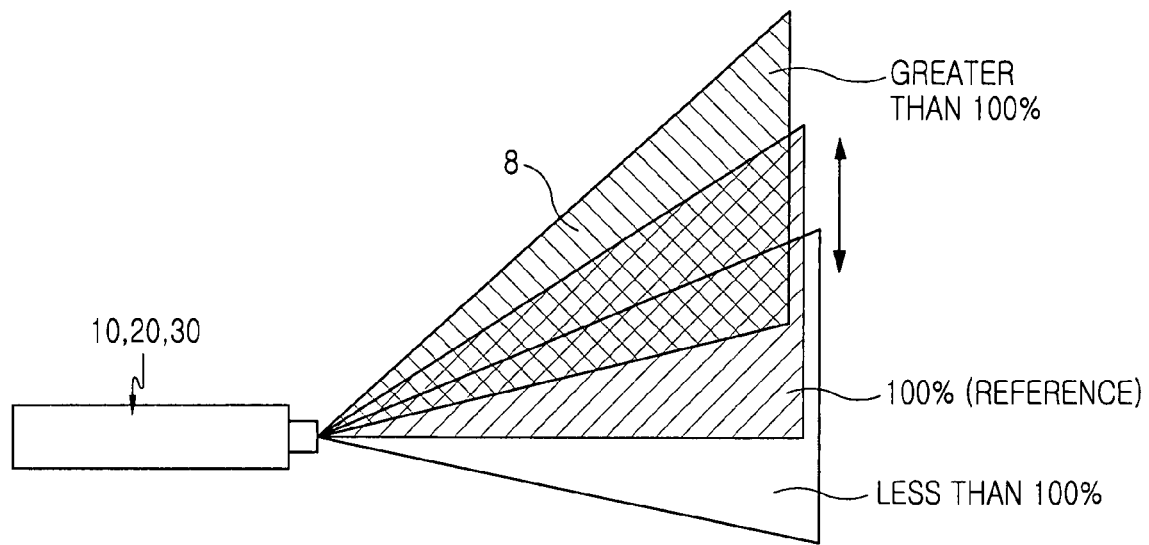
FIG. 10 is a view illustrating an in-use state of the image offset adjustment apparatuses for an LCD projector in accordance with the present invention.

As can be readily seen from FIG. 10, the image offset indicates the entire image 8 to be projected, and, when the projected image 8 is referenced as 100%, the image offset can be adjusted to be greater or less than 100%.

The projection lenses 14 are located around the center axis of the lens housing 11, and, as the lens housing 11 is rotated through the rotation means 12, the projection lenses 14 are integrally rotated therewith so that the selected projection lense 14 which has an image offset desired by the user can be positioned in the incident direction of the light A1.

Referring to FIG. 5, the rotation means 12 is composed of a gear 12a and a motor 12b. The gear 12a is formed on the circumferential outer surface of the lens housing 11 to mesh with a motor gear 12c of the motor 12b. The motor 12b is engaged with the gear 12a through the motor gear 12c, and is rotatably driven in response to a signal from the controller 13.

The operations of the image offset adjustment apparatus for an LCD projector in accordance with a first embodiment of the present invention, constructed as mentioned above, will be described with reference to FIGS. 4, 5 and 10.

As shown in FIGS. 4 and 5, the image offset adjustment apparatus 10 for an LCD projector comprises the projection lens section including the plurality of projection lenses 14 on which the LCDs 5 having different image offsets are respectively placed, the lens housing 11 for installing the projection lenses 14 to be adjacent to one another, the rotation means 12, and the controller 13.

The light A1 emitted from the light source 2 is reflected by the first and second mirrors 3 and 4 and is incident on one of the LCDs 5, and then the image 8 generated in the corresponding LCD 5 is projected on the screen through the projection lenses 14.

At this time, when the user wants to change the image offset, a signal is applied to the controller 13, and the controller 13 drives the rotation means 12.

Then, the motor 12b of the rotation means 12 is actuated to rotate the motor gear 12c of the motor 12b. Due to the fact that the motor gear of 12c the motor 12b and the gear part 12a formed on the circumferential outer surface of the lens housing 11 mesh with each other, as the motor gear 12c of the motor 12b rotates, the gear 12a is also rotated to rotate the lens housing 11.

Since the plurality of projection lenses 14 on which the LCDs 5 having different image offsets are respectively placed are adjacently installed inside the lens housing 11, as the lens housing 11 is rotated, the projection lenses 14 are also integrally rotated therewith. As the projection lenses 14 are rotated, one of the projection lenses 14 which has the image offset desired by the user can be positioned in the incident direction of the light A1.

In this state, as shown in FIG. 10, the user can project the desired image offset on the screen 7 through the selected projection lens 14 and then view the corresponding image. The image offset indicates the entirety of the projected image 8, and, when the projected image 8 is referenced as 100%, the offset of the image 8 can be adjusted to be greater or less than 100% through the projection lens 14 selected by the user.

Hereafter, an image offset adjustment apparatus for an LCD projector in accordance with a second embodiment of the present invention will be described with reference to FIGS. 6, 7 and 10.

Figure 6:
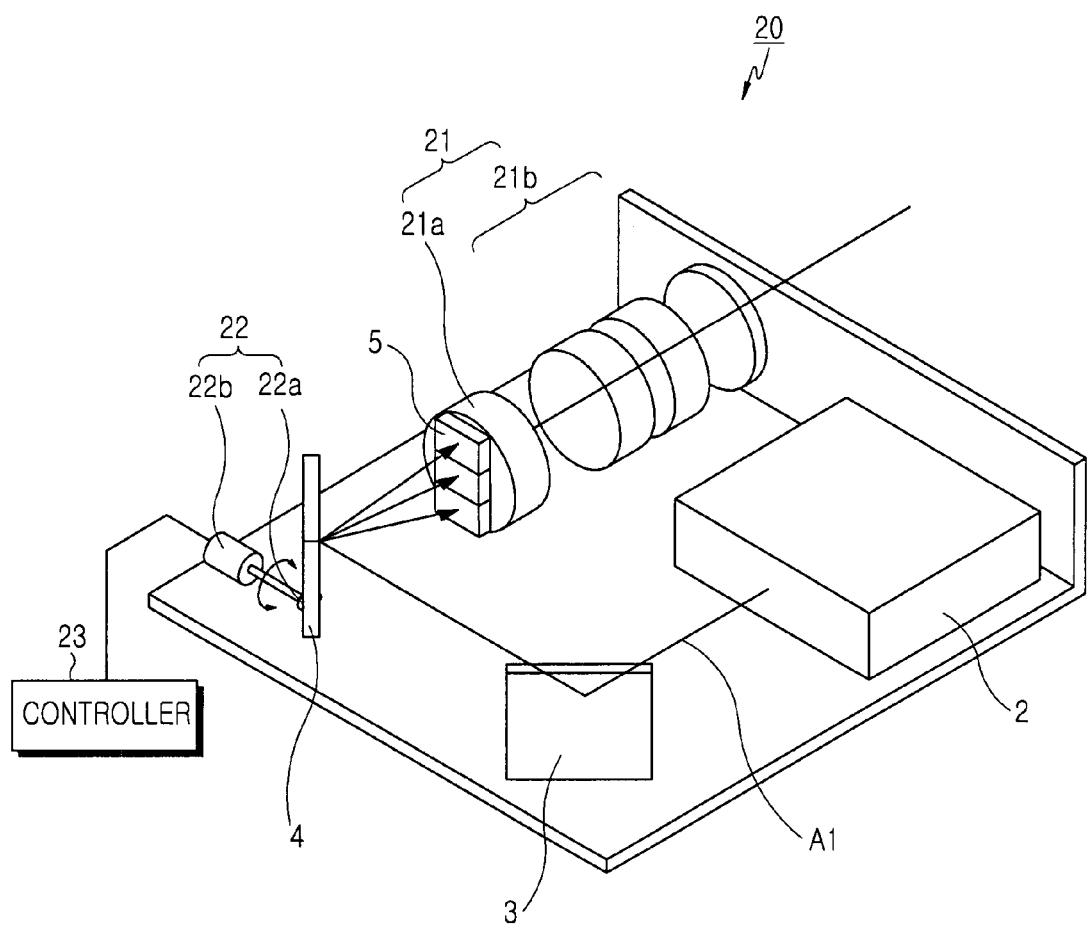
FIG. 6 is a perspective view illustrating the construction of an image offset adjustment apparatus for an LCD projector in accordance with a the present invention.
Figure 7:
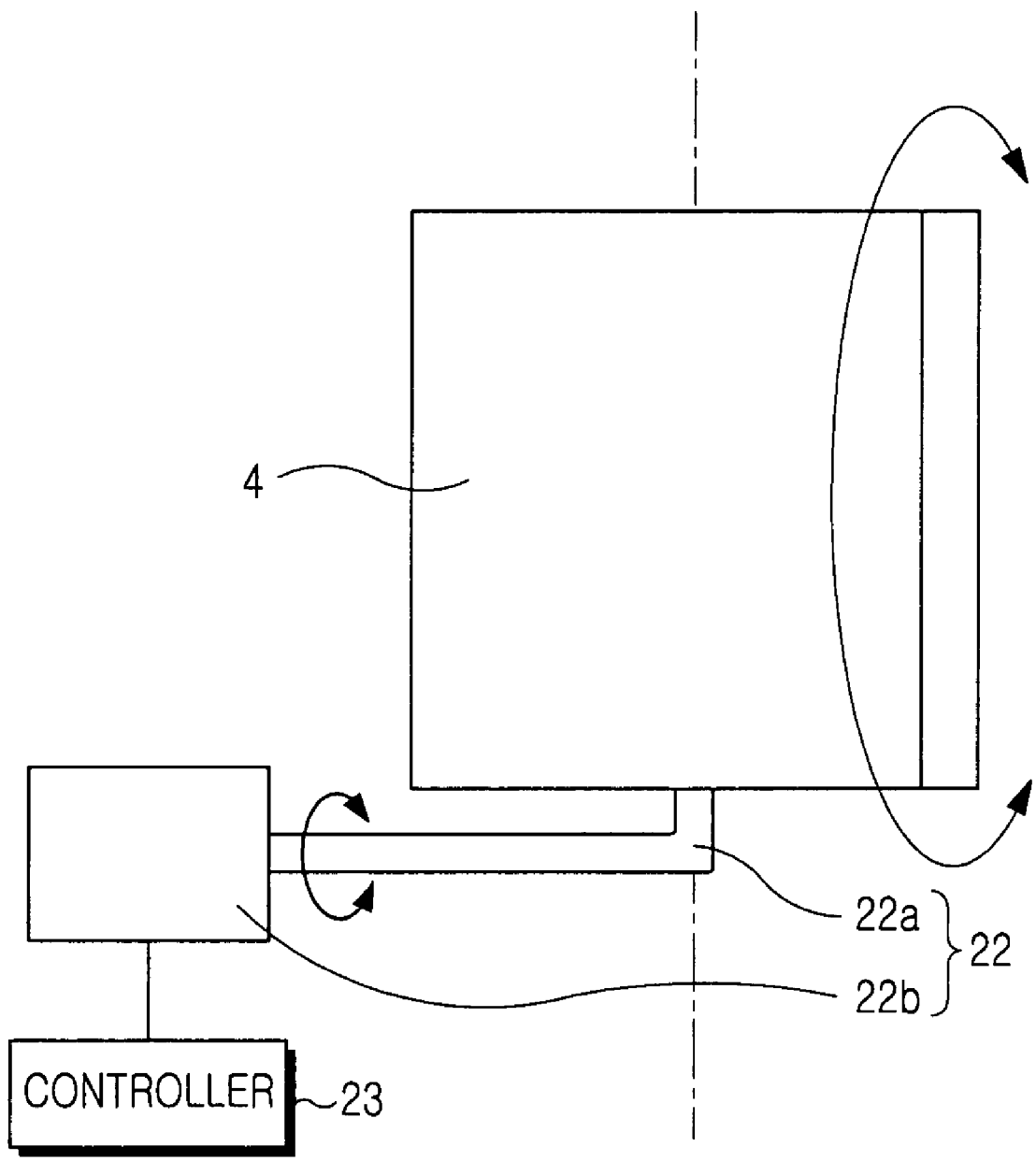
FIG. 7 is a front view illustrating the operation of the image offset adjustment apparatus for an LCD projector in accordance with the present invention.

Referring to FIGS. 6 and 7, the image offset adjustment apparatus 20 for an LCD projector comprises a first projection lens 21a which is located in the reflection direction of light A1 and which includes a plurality of LCDs 5 to have different image offsets, a rotation means 22, and a controller 23.

A projection lens section 21 is composed of first and second projection lenses 21a and 21b.

The light A1 emitted from a light source 2 is refracted by first and second mirrors 3 and 4 and is incident on one of the LCDs 5, and the image 8 generated in the corresponding LCD 5 is projected on the screen (not shown) through the projection lens section 21.

Due to the fact that the plurality of LCDs 5 having different image offsets are provided to the front surface of the first projection lens 21a, when a user wants to change the image offset, a signal is applied to the controller 23, and the controller 23 drives the rotation means 22.

As shown in FIG. 7, if the mirror motor 22b of the rotation means 22 is actuated, the second mirror 4 can be rotated in upward and downward directions by the mirror motor 22b. The mirror motor 22b and the second mirror 4 are connected with each other by a connection member 22a which converts the rotation of the mirror motor 22b into the upward and downward rotation of the second mirror 4. Therefore, if the mirror motor 22b is rotated, the second mirror 4 can be rotated in the upward and downward directions via the connection member 22a.

The first projection lens 21a is located at a position which faces the second mirror 4, and the plurality of LCDs 5 having different image offsets are provided to the first projection lens 21a. Thus, if the second mirror 4 is rotated in an upward or downward direction, the traveling angle of the light A1 which is reflected by the second mirror 4 is changed, and the light A1 can be incident on the LCD 5 having the image offset desired by the user.

The plurality of LCDs 5 are located in the longitudinal direction when viewed from a direction in which the light A1 is reflected.

In this state, as shown in FIG. 10, the user can project the desired image offset on the screen through the selected LCD 5 and then view the corresponding image. The image offset indicates the entirety of the projected image 8, and, when the projected image 8 is referenced as 100%, the offset of the image 8 can be adjusted to be greater or less than 100% by the medium of the projection lens 14 selected by the user through rotating the second mirror 4 in the upward and downward directions.

Hereafter, an image offset adjustment apparatus for an LCD projector in accordance with a third embodiment of the present invention will be described with reference to FIGS. 8, 9 and 10.

Figure 8:
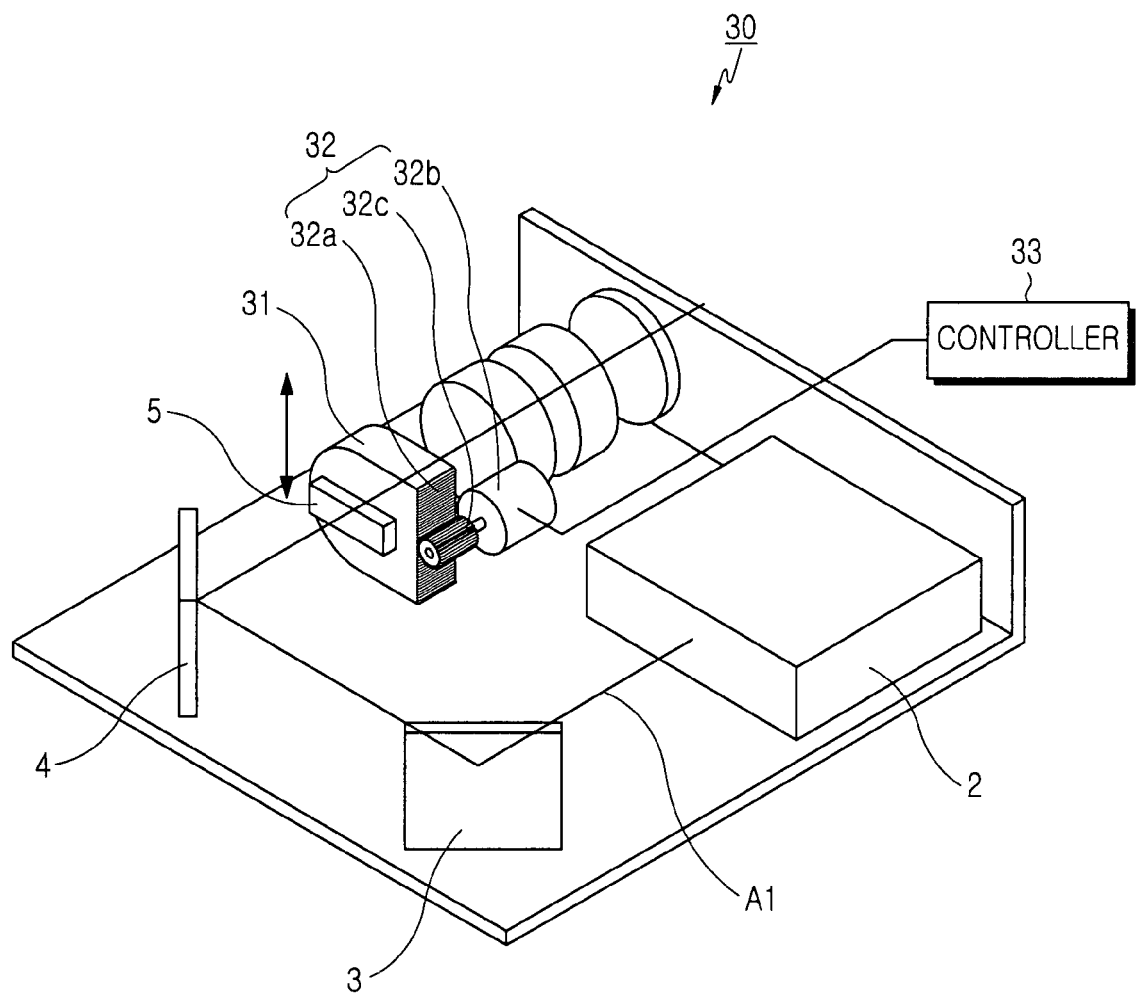
FIG. 8 is a perspective view illustrating the construction of an image offset adjustment apparatus for an LCD projector in accordance with a the present invention.
Figure 9:
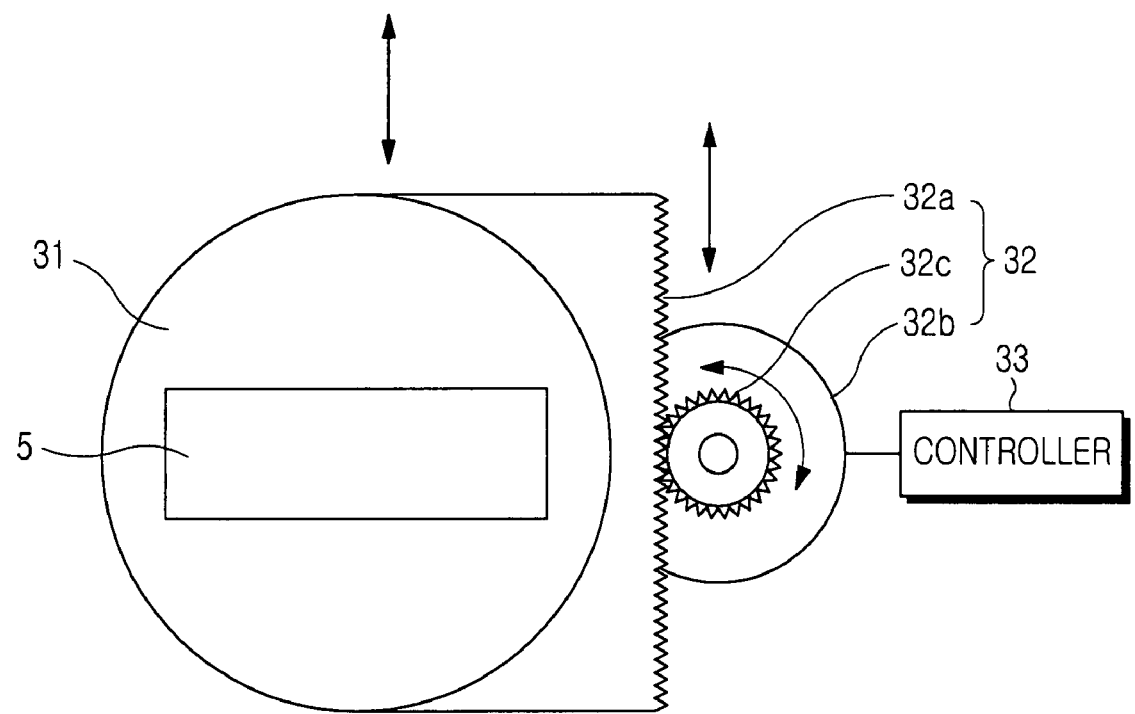
FIG. 9 is a front view illustrating the operation of the image offset adjustment apparatus for an LCD projector in accordance with the present invention.

Referring to FIGS. 8 and 9, the image offset adjustment apparatus 30 for an LCD projector comprises a projection lens 31 which is located in the refraction direction of light A1 and includes an LCD 5 provided on the front surface thereof, a moving means 32, and a controller 33.

The light A1 emitted from a light source 2 is reflected by first and second mirrors 3 and 4 and is incident on the LCD 5, and the image 8 generated by the LCD 5 is projected on the screen through the projection lens 31.

In this state, when a user wants to change the image offset, a signal is applied to the controller 33, and the controller 33 drives the moving means 32.

As shown in FIG. 9, due to the fact that the motor gear 32c of the motor 32b of the moving means 32 meshes with a rack gear 32a formed on the side surface of the projection lens 31, if the motor gear 32c of the motor 32b is rotated, the rotational motion of motor the gear 32c is converted into the linear motion of the rack gear 32a to move the projection lens 31 in the upward direction.

At this time, the LCD 5 provided to the front surface of the projection lens 31 is also moved upward to adjust the image offset as desired by the user.

In this state, as shown in FIG. 10, the user can project the desired image offset on the screen through the moved projection lens 31 and then view the corresponding image. The image offset indicates the entirety of the projected image 8, and, when the projected image 8 is referenced as 100%, the offset of the image 8 can be adjusted to be greater or less than 100% through moving the projection lens 14 in the upward and downward directions.

Figure 11:
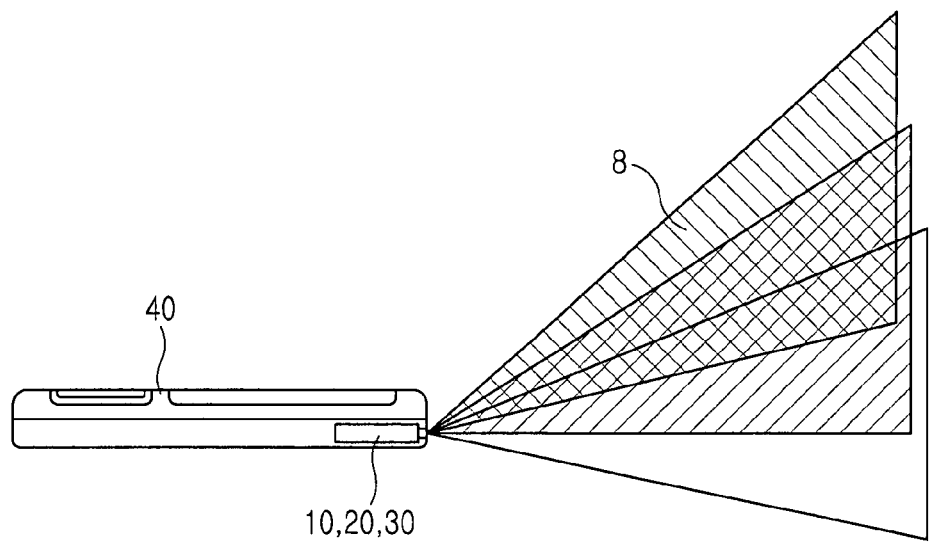
FIG. 11 is a view illustrating a state in which the image offset adjustment apparatuses for an LCD projector in accordance with the present invention are used in a mobile phone.

FIG. 11 illustrates a mobile phone having an image offset adjustment apparatus for an LCD in accordance with still another embodiment of the present invention. In this embodiment, as each of the above-described image offset adjustment apparatus 10, 20 and 30 is provided in a mobile phone, portability of the mobile phone having the image offset adjustment apparatus can be improved, and it is possible to adjust the screen size and position as desired by a user without the need of using a separate screen.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An image offset adjustment apparatus for an LCD projector including a light source for emitting light, mirrors arranged in front of the light source to reflect light, and an LCD installed in front of the mirrors so that reflected light is transmitted to the LCD, that, when electric signals corresponding to a desired image drive liquid crystals and are selectively applied to a plurality of electrodes, alignment of the liquid crystals filled in the selected electrodes is changed to generate an image, and that the image generated in the LCD is enlarged and projected on a screen, the image offset adjustment apparatus comprising:

a projection lens section including a projection lens having a front surface on which the LCD is located;

moving means positioned adjacent to the projection lens to move the projection lens; and a controller for controlling the moving means so that the LCD can be moved integrally with the projection lens when the projection lens is moved, to select one of image offsets as desired by a user.

2. The apparatus as set forth in claim 1, wherein the image offset indicates the entire image to be projected, and, when the projected image is referenced as 100%, the image offset can be adjusted to be greater or less than 100%.

3. The apparatus as set forth in claim 1, wherein the moving means comprises a rack gear formed on a side surface of the projection lens and a motor having a gear portion which meshes with the rack gear, and wherein, as the motor is driven in response to a signal from the controller, the rack gear is moved upward and downward along a straight path.

4. A mobile phone having an image offset adjustment apparatus for an LCD projector including a light source for emitting light, mirrors arranged in front of the light source to reflect light, and an LCD installed in front of the mirrors so that reflected light is transmitted to the LCD, that, when electric signals corresponding to a desired image drive liquid crystals and are selectively applied to a plurality of electrodes, alignment of the liquid crystals filled in the selected electrodes is changed to generate an image, and that the image generated in the LCD is enlarged and projected on a screen, the image offset adjustment apparatus comprising:

a projection lens section including a projection lens having a front surface on which the LCD is located;

moving means positioned adjacent to the projection lens to move the projection lens; and a controller for controlling the moving means so that the LCD can be moved integrally with the projection lens when the projection lens is moved, to select one of image offsets as desired by a user.

* * * * *